United States Patent Office 3,383,977
Patented May 21, 1968

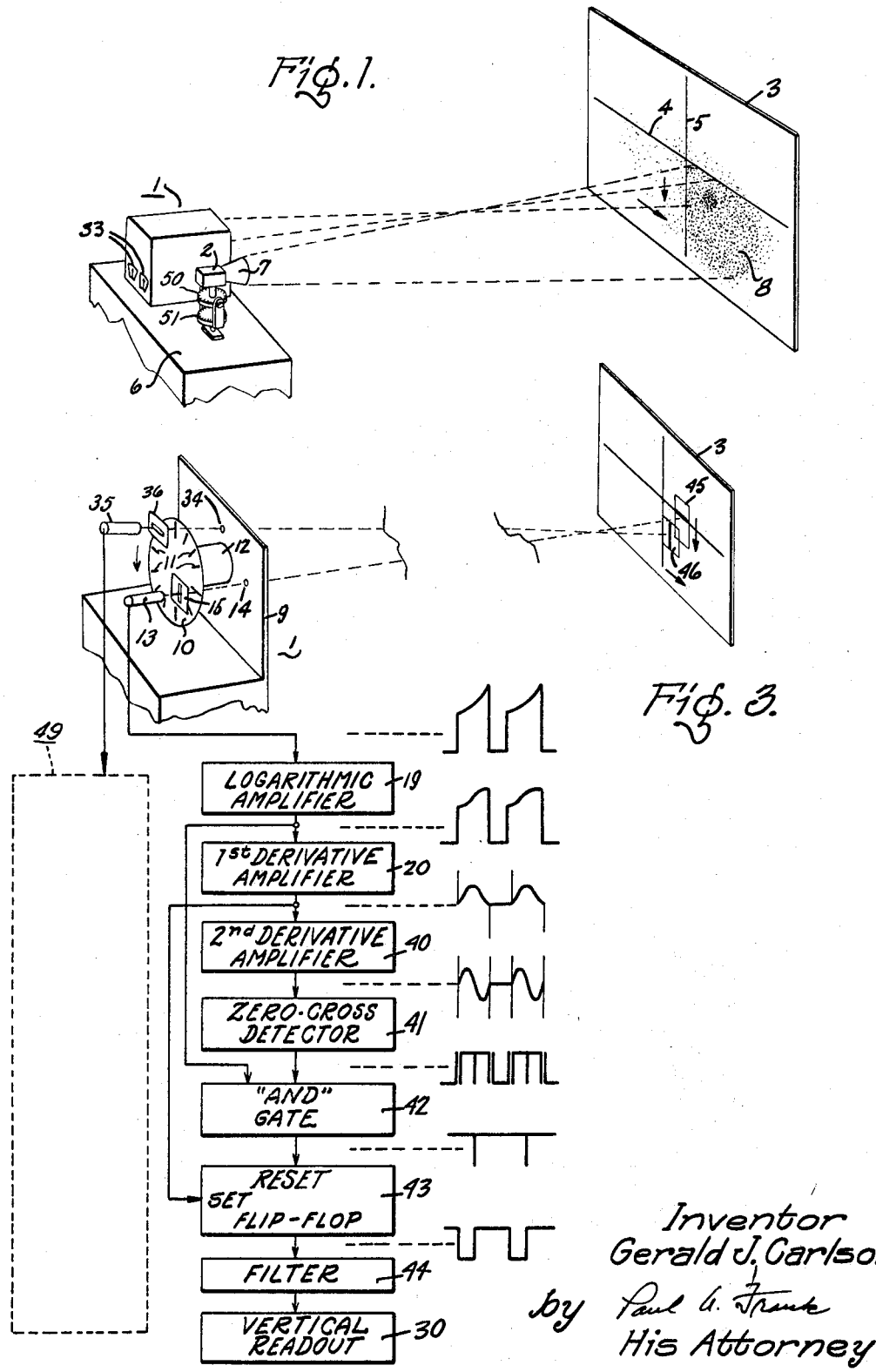

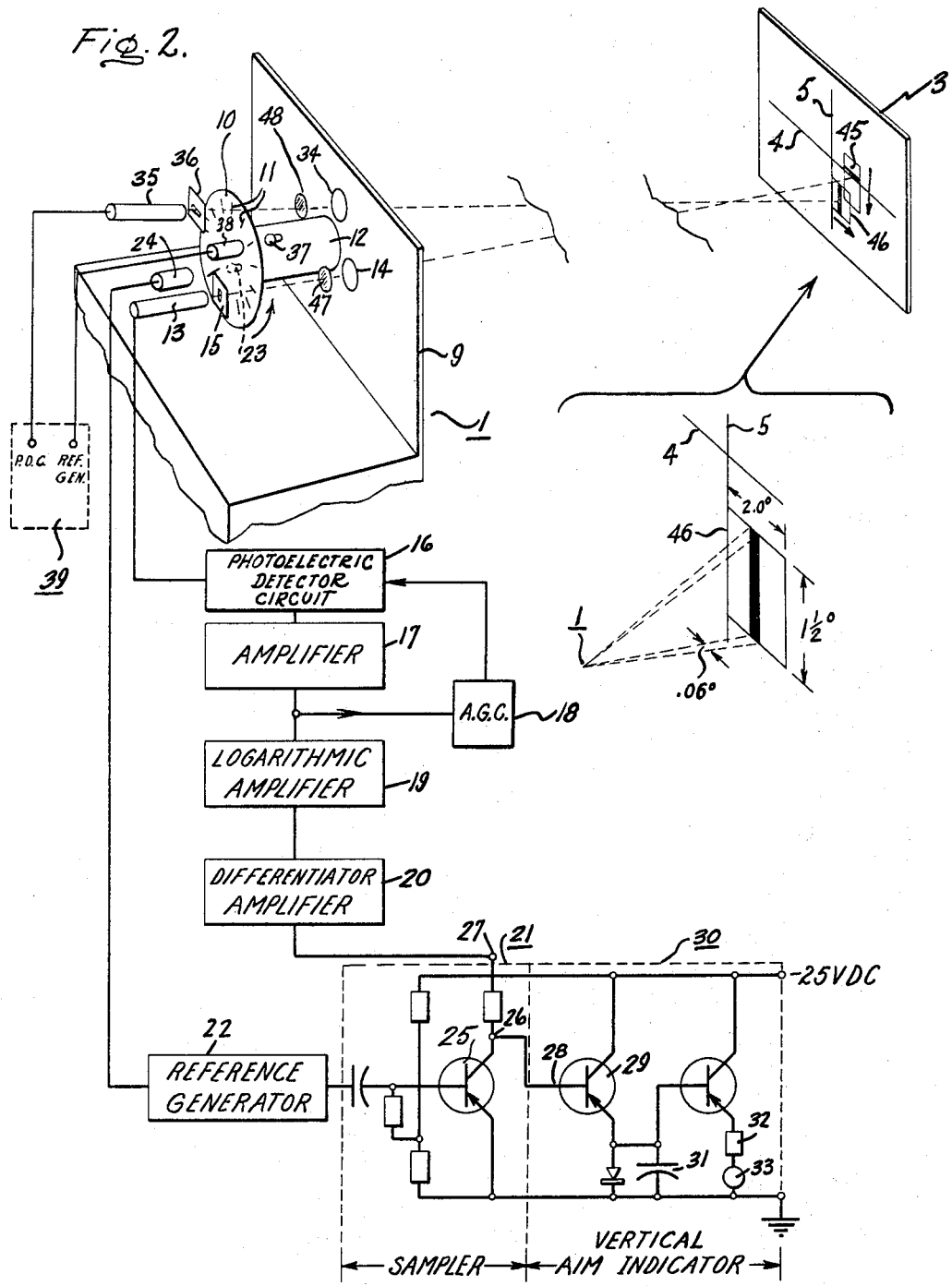

3,383,977
METHOD AND APPARATUS FOR INDICATING THE AIM OF PROJECTION-TYPE LAMPS
Gerald J. Carlson, Scotia, N.Y., assignor to General Electric Company, a corporation of New York
Filed Dec. 30, 1963, Ser. No. 334,167
5 Claims. (Cl. 88—14)

ABSTRACT OF THE DISCLOSURE

Apparatus and method for determining the vertical and horizontal aim points of projection-type lamps by detecting maximum rate of change of the logarithmic brightness pattern along selected edges of a nonuniform brightness pattern produced by the lamp light beam on a reflective reference plane. Apparatus comprises a rotating disk having narrow radial slits and a pair of optical circuits each comprising a photoelectric cell, slitted mask and pinhole (or focussing lens and aperture) for line-by-line scanning of small rectangular areas of the brightness pattern along two adjacent edges thereof. Electrical circuits connected to outputs of the optical circuits comprise logarithmic amplifiers for converting the viewed areas to logarithmic pattern signals, differentiator amplifiers for obtaining the rate of change of the logarithmic brightness pattern signals and readout circuits for detecting the maximum rate of change of such signals to thereby determine the vertical and horizontal aim points.

My invention relates to a method and apparatus for determining the horizontal and vertical aim points of projection-type lamps, and in particular, to a method and apparatus for determining such aim points by detecting the point of maximum rate of change of a logarithmic brightness pattern.

In the manufacture of preaimed lamps such as projection-type lamps utilized in automobile headlights, spotlights, and searchlights, optical or mechanical imperfections may occur and thereby alter the light beam direction or aim point of the lamp. A specific lamp visual aim test developed by the Society of Automotive Engineers prescribes the distribution of the brightness pattern formed by type 4002 sealed beam headlamps on a white screen having reference axes described thereon and positioned 25 feet from the lamp. The test specifies tolerance limits within which two edges of the beam pattern must fall relative to the crossed reference axes on the screen. Three known methods exist for determining the aim point of automobile headlamps. In the first, known as the Christenson method, a series of lenses and mirrors positioned a short distance from the lamp direct the light beam emitted from the lamp back to a reference plane mounted adjacent the lamp. This first method has the disadvantage that it fails to simulate the prescribed 25-foot distance in an accurate manner. The second known method employs a white screen positioned at the prescribed distance from the lamp and having a plurality of apertures within the screen and photoelectric devices positioned on the opposite side thereof. The photoelectric devices sense the brightness of the light beam at particular points along the cross section thereof and selected ratios of the detected brightnesses are employed to obtain a figure of merit for the aim point of the lamp. The disadvantage of this second method is that the aim point may be incorrect and yet produce a ratio having an acceptable value. Perhaps the most accurate of the previously known methods is the visual aim method wherein the lamp brightness pattern is formed on the white screen having reference axes described thereon. The screen is positioned at the prescribed 25-foot distance and an experienced observer determines whether or not the lamp is aimed properly relative to the reference axes. The average experienced observer can determine the lamp aim to within ±0.1 degree. This visual aim method leaves much to human judgment, however, and, therefore, may lead to contradicting results.

Therefore, an object of my invention is to provide a new method and apparatus for accurately determining the aim point of preaimed lamps.

A further object of my invention is to provide a new method and apparatus for accurately determining the aim point of projection-type lamps by detecting the point of maximum rate of change of a logarithmic brightness pattern signal developed from a selected region of a nonuniform brightness pattern.

In accordance with my invention in meeting the objects enumerated above, I provide an apparatus including a rotatable disk enclosed in a suitable housing. The disk has a plurality of narrow radial slits evenly spaced around the periphery thereof for scanning the non-uniform brightness pattern produced by a light beam emanating from a projection-type lamp and illuminating a partially reflective reference plane. A pair of optical circuits positioned within the housing and spaced from each other peripherally along the slitted portion of the disk are adapted to view relatively small regions of the brightness pattern along two selected edges thereof. A pair of electrical circuits are operatively coupled to the outputs of the optical circuits. Each electrical circuit comprises a serial connection of a logarithmic amplifier for converting the viewed region of the brightness pattern to a logarithmic brightness pattern signal and a differentiator amplifier for obtaining the rate of change of the logarithmic brightness pattern signal. Readout devices are employed to detect the maximum rate of change of such signals and thereby determine, respectively, the vertical and horizontal aim points of the lamp.

The method for determining the aim point of the lamp is as follows. The lamp aim apparatus hereinabove described is mounted adjacent a rotatably positionable lamp test fixture and both are positioned at a distance of 25 feet from the partially reflective reference plane. The lamp aim apparatus and lamp test fixture are then aligned with respect to a selected region on the reference plane. The lamp to be tested is thence inserted in the fixture and electrically energized whereby a beam of light emanates from the lamp and illuminates the reference plane to produce a nonuniform brightness pattern thereon. The indications on the horizontal and vertical readout devices are noted for this initial and nominal aim point of the lamp. The lamp test fixture is thence slightly rotated in azimuth to obtain the maximum indication on the horizontal readout device, and the corresponding azimuth angle is recorded thereby determining the horizontal aim point of the lamp. In like manner, the vertical aim point is measured by rotating the lamp fixture in elevation and searching for a maximum indication on the vertical readout device.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings, wherein like parts in each of the several figures are identified by the same reference character and wherein:

FIGURE 1 illustrates the relative position of the reference plane, lamp test fixture, and my lamp aim apparatus as employed in determining the aim point of a projection-type lamp inserted in the test fixture;

FIGURE 2 illustrates a first and preferred embodiment of the lamp aim apparatus constructed in accordance with my invention; and FIGURE 3 illustrates a second embodiment of a lamp aim apparatus constructed in accordance with my invention.

The previously most accurate method for determining the aim point of projection-type lamps, such as automobile sealed beam headlamps, has been the visual aim method wherein experienced observers inspect the nonuniform beam pattern as displayed on a white screen at a distance of 25 feet from the lamp. Although this visual test can determine the lamp aim to within ±0.1 degree on the average, such visual test is subject to human judgment and therefore may produce contradicting results. It has been found that the human eye is responsive to logarithmic changes in lamp brightness and the photometric parameter employed by the observers in judging the visual aim point is based on the point where the logarithmic brightness pattern has a maximum rate of change in the region of the horizontal and vertical reference axes described on the white screen. Thus, in the inspection of automobile sealed beam headlamps of the "low beam" type, the visual aim specification relates to the position of the left-hand edge and the top edge of the primary beam pattern formed on the white screen. The area of the primary beam pattern, that is, the more concentrated portion of the "low beam," is indicated in FIGURE 1 as being bounded by the right portion of a horizontal reference axis and the lower portion of a vertical reference axis described on the white screen or reference plane.

My lamp aim apparatus is adapted to simulate the human visual perception process. It is thus designed to provide as a minimum the accuracy obtained by experienced observers, by simulating the human eye response to logarithmic changes in a brightness pattern along the upper and left edge thereof without the attendant errors due to human judgment.

Referring now to FIGURE 1, there is shown the relative position of my lamp aim apparatus designated as a whole by numeral 1, rotatably positionable lamp test fixture 2, and a reference plane 3. Horizontal 4 and vertical 5 reference axes are described on reference plane 3 merely for convenience in designating the edges of the primary beam pattern and it is to be understood that such reference axes are not required for the successful operation of my apparatus. Lamp aim apparatus 1 and lamp test fixture 2 are disposed adjacent each other and positioned on a suitable mounting support 6 which provides a rigidly fixed support for apparatus 1 and fixture 2. Reference plane 3 is spaced 25 feet from apparatus 1 and fixture 2 in accordance with prescribed visual aim specifications and is characterized by a partially reflective surface. A preaimed lamp 7, to be tested for its horizontal and vertical aim points, is inserted into test fixture 2 whereby upon electrical energization such lamp emits a nonuniform beam of light which illuminates the reference plane. The nonuniform light beam is illustrated on the reference plane in FIGURE 1 as brightness pattern 8. Lamp aim apparatus 1 is adapted to detect the horizontal and vertical aim points of lamp 7 by scanning selected small regions of the brightness pattern 8 in a manner to be disclosed in greater detail hereinafter.

FIGURE 2 illustrates a preferred embodiment of my lamp aim apparatus 1. Apparatus 1 includes an enclosed housing, only a first wall 9 thereof being shown for purposes of illustrating the interior of such housing. A rotatable scanning device in the form of a rotatable disk 10 having a plurality of narrow radial slits 11 evenly spaced around the periphery thereof is supported within housing 1 and rotated by a suitable motor drive 12. A first optical circuit, including a first photoelectric device 13, slitted mask 15, focusing lens 47, and aperture 14, is operatively coupled to each radial slit in succession as the disk rotates. The photoelectric device 13 is stationarily positioned on the side of rotatable disk 10 removed from wall 9. Mask 15, containing a narrow slit substantially perpendicular in orientation to the disk slits 11 as they pass thereby, is interposed between photoelectric device 13 and disk 10. Focusing lens 47 is mounted between disk 10 and the aperture 14 disposed in wall 9. The first optical circuit is in alignment with a first selected area 45 located on the reference plane 3 along the upper edge of the primary beam pattern, i.e., in the vicinity of the right horizontal reference axis 4. Aperture 14, lens 47, mask 15, and photoelectric device 13 are illustrated as being disposed horizontally of motor drive 12 for the particular application of detecting the vertical aim point of a "low beam" type automobile headlamp. However, in the most general application, such elements may be positioned elsewhere, the criterion being that they be aligned with a selected area on the reference plane and the radial slit portion of disk 10.

The scanning of selected area 45 is accomplished by the first optical circuit in the following manner. The rotation of disk 10 in the indicated counterclockwise direction presents an instantaneous field of view to photoelectric device 13 comprising a well defined narrow horizontal region within area 45, illustrated as the shaded horizontal line, which moves in the indicated downward direction as a particular disk slit traverses the field of view of device 13. Thus, a line-by-line scan of area 45 is accomplished, the resolution of the scan (and thus a measure of the accuracy) being dependent on the narrow dimension of slit 11 wherein resolution is defined by the vertical dimension of the shaded horizontal line in area 45. The main function of mask 15 is to provide a well defined and controllable scanned area 45 comprising rectangular shaped scanning lines of equal area along the whole scanned area. Aperture 14 is not necessary to the successful operation of my apparatus, although it does tend to shield the optical circuit from extraneous light. Alternatively, wall 9 may be omitted and lens 47 mounted in a hollow opaque tube forming part of the first optical circuit. Finally, lens 47 may be omitted and aperture 14 made of pinhole size as illustrated in the FIGURE 3 embodiment. In this latter arrangement, the light source 7 must be sufficiently bright and the photoelectric device 13 sufficiently sensitive for proper operation of the apparatus.

Photoelectric device 13 may be any suitable photoemissive device such as a photomultiplier tube or a sensitive photovoltaic device which responds linearly to light intensity. Photoelectric device 13 is connected in a conventional photoelectric detector circuit 16. The output signal of the photoelectric device is proportional to the brightness of the scanned portion (area 45) of the light beam image formed on reference plane 3. This signal is amplified by means of a conventional electronic amplifier circuit 17. An automatic gain control (AGC) circuit 18 is connected from an output of amplifier circuit 17 and fed back to photoelectric detector circuit 16. The gain of photoelectric devices such as photomultiplier tubes is notoriously variable with small changes in supply voltage. Therefore, the AGC circuit 18 is employed to control the supply voltage for the photoelectric device in a manner whereby the amplitude of the output signal thereof is maintained constant regardless of any tendency for the signal amplitude to change. This tendency to vary in amplitude can result from changes in light intensity from one lamp to the next, aging of the photoelectric device, different characteristics of replacement tubes or transistors in the various circuits, drift in the amplifier circuit, and changes in the line voltage. A conventional logarithmic amplifier circuit 19 is connected to an output of circuit 17 and converts the electrical signal representing the viewed region of the brightness pattern to a logarithmic brightness pattern signal. The logarithmic brightness pattern signal appearing at the output of logarithmic amplifier 19 is thence differentiated in a conventional differentiator amplifier circuit 20. The electrical signal output from differentiator amplifier circuit 20 therefore represents the rate of change of a logarithmic brightness pattern in a selected relatively small area 45 on the reference plane along the upper edge of the primary beam pattern, i.e., in the vicinity of the right horizontal reference axis 4.

The human visual perception process employed to determine the aim point of projection-type lamps is simulated in my apparatus by sensing the point at which the logarithmic brightness pattern signal has a maximum amplitude in the vicinity of the reference axes (horizontal axis in the case of the vertical aim point). This maximum amplitude point is determined from a sampler circuit 21 which samples the amplitude of the differentiated logarithmic signal at a reference point near the normal aim axis. The reference point is derived from a reference generator circuit 22 which generates a train of electrical sampling pulse signals in synchronism with the rotation of disk 10. The train of signals or reference pulses are generated by means of a second optical circuit comprising a first light source 23 positioned on one side of the radial slit portion of disk 10 and a second photoelectric device 24 positioned on the opposite side of the disk and in alignment with the radial slit portion of the disk and light source 23. The second optical circuit is spaced from the first optical circuit peripherally along the disk. Light source 23 is adjustably positionable in a peripheral direction along the disk for the purpose of centering the reference pulse near the midpoint of the respective brightness pattern scan. Reference generator circuit 22 also comprises an amplification stage of conventional design. The width of the reference pulse thus formed can be made a small part of the brightness pattern scan by a suitable choice of a small light source 23 and photoelectric device 24 or by suitable use of masks (not shown) to limit the field of view of the photoelectric device 24. The sampler circuit 21 is illustrated in detail since such circuit has not heretofore been disclosed to my knowledge.

Sampler circuit 21 comprises a transistor 25 which is normally in a conductive state in the absence of signals from reference generator 22. Thus, the transistor collector voltage (point 26 in circuit 21) approaches the emitter voltage which in the particular illustration is at ground potential. This causes the signal appearing on the base electrode 28 of transistor 29 to be near ground potential regardless of the signal output 27 of differentiator amplifier 20. The appearance of a reference pulse at the output of reference generator 22 renders transistor 25 nonconductive and the voltage at the output of differentiator amplifier 20 (point 27) is thereby impressed on base electrode 28 of transistor 29. The relative amplitude of the differentiated logarithmic brightness signal is therefore sampled once each scan for a time duration equal to the width of the reference pulse. Transistor 29 is an element in a vertical readout or aim indicator circuit 30. The non-conduction of transistor 25 impresses a fraction of the voltage appearing at base electrode 28 across capacitor 31. Upon conduction of transistor 25, capacitor 31 discharges through a resistor 32, capacitor 31 time constant. A readout means, such as current measuring device 33, is included in the discharge path of capacitor 31 and thereby provides a visual indication of time averaged voltage samples of the differentiated logarithmic brightness pattern signal appearing at point 27 during the time of the reference pulse and is thus adapted to determine the vertical aim point of projection-type lamp 7.

The vertical aim point of the lamp 7 is determined from the optical-electrical circuit hereinabove described. The horizontal aim point of the lamp is determined in a like manner by employing a second optical-electrical circuit which comprises similar elements. The optical circuit of the optical-electrical horizontal aim point circuit is postioned peripherally along disk 10 at 90 degrees with respect to the vertical aim point optical circuit. Thus, lens 43 is disposed vertically of motor drive 12. The essential components of the horizontal aim point optical circuit comprise a third photoelectric device 35, horizontally slitted mask 36, and focusing lens 48 aligned with the slitted portion of disk 10 and a second selected area 46 on reference plane 3 along the left edge of the primary beam pattern, i.e., in the vicinity of the lower vertical reference axis. The area 46 is scanned in a line-by-line manner, similar to that described for scanned area 45, except that now a well-defined narrow vertical region moves in the indicated direction to the right as a particular disk slit traverses the field of view of device 35. As mentioned relative to the vertical aim point optical circuit, lens 48 may be mounted in an opaque tube, and aperture 34 may be employed or, in the alternative, a pin-hole aperture 34 may be substituted for lens 48. A second adjustably positionable light source 37 is disposed on one side of the radial slit portion of disk 10 and a fourth photoelectric device 38 is stationarily positioned on the opposite side of the disk and in alignment with light source 37 and the radial slit portion of the disk. The latter (fourth) optical circuit is spaced peripherally along disk 10 whereby all four of the optical circuits are separated sufficiently from each other to prevent any substantial interaction therebetween. Photoelectric devices 35 and 38 are operatively coupled to the photoelectric detector circuit (PDC) and reference generator circuit (REF. GEN.), respectively, in the electrical circuit designated as a whole by numeral 39. Circuit 39 includes the automatic gain control, logarithmic amplifier, differentiator amplifier, sampler circuit, and aim indicator or readout circuit for providing the visual indication of the amplitude of the differentiated logarithmic brightness pattern of the reference plane in the vicinity of the vertical reference axis.

A specific embodiment of my apparatus hereinabove described is comprised of the following elements. Reference plane 3 is a screen located 25 feet from lamp aim apparatus 1 and lamp test fixture 2 and has a flat white surface characterized by uniform reflectivity. Lamp test fixture 2 is normally adapted to provide adjustment of the mounting thereof over an angle of ±2 degrees in azimuth and elevation and is provided with suitable angle indicating means 50, 51 for measuring such angles to the nearest 0.05 degree. Lamp aim apparatus 1 is contained within a cabinet or housing having physical dimensions of height, twelve and one-half inches; width, eighteen inches; and length, twenty-four and one-half inches. Scanning disk 10 is eight inches in diameter and contains 50 radial slits, each having a dimension of 0.010 x 1⅛ inches. Disk 10 is rotated by a 1/30 horsepower induction motor at 1300 r.p.m., resulting in a scanning rate of approximately 1000 per second. Lenses 47 and 48 are three inches in diameter. The instantaneous field of view for each brightness pattern scanning optical circuit is approximately 0.06 by 1.5 degrees as determined by the dimensions of disk slits 11 and slits of masks 15, 36. As disk 10 rotates in the direction indicated on the figures, a zone within the beam pattern is repetitively scanned over a restricted range of about 2 degrees. Therefore, the total scanned zone is approximately 1.5 by 2 degrees in the region of the upper and left edges of the primary beam pattern, i.e., the horizontal and vertical reference axes. Since the disk need only rotate through a small angle to obtain the desired scan, the scan is approximately a rectangle, although the disk slits move in a circular direction.

Photoelectric devices 13 and 35 comprise photomultiplier tubes type 1P21 and are each connected across a high voltage direct current power supply. Photoelectric detector circuit 16 comprises a plurality of resistors interconnecting the nine stages of secondary emission electrodes which provide the multiplication phenomenon. Amplifier circuit 17 comprises a cascade arrangement of three conventional transistor amplifier circuits, each transistor being of the type 2N526. A first and adjustable output of amplifier circuit 17 is connected to the automatic gain control circuit 18 which comprises a peak detector circuit. The peak detector circuit, of conventional design, limits the maximum direct current signal fed back to a 2C53 vacuum tube which controls the high voltage applied to the photomultiplier tube. This automatic gain control circuit thus controls the amplitude of the power supply voltage in a manner whereby the gain of the photomultiplier tube is varied to maintain the amplitude of its output signal constant regardless of any tendency for such signal to change. A second output of amplifier circuit 17 is connected to logarithmic amplifier circuit 19. The logarithmic element is a 1N482 silicon diode which exhibits a logarithmic characteristic in the voltage across the diode when a current of less than 1 milliampere passes through the diode in the forward direction. An amplification stage comprising a conventional transistor (type 2N167) amplifier circuit and an emitter follower circuit including a transistor type 2N526 are also contained in logarithmic amplifier circuit 19. The output of the emitter follower circuit is connected to a differentiator amplifier circuit 20 which comprises a resistor-capacitor differentiating circuit and amplification stages. The capacitor is 0.005 microfarad and the resistor is the input impedance of the differentiator amplifier circuit and is approximately 6800 ohms. Three stages of conventional transistor (type 2N526) amplifier circuits are utilized in the differentiator amplifier circuit 20. Adjustably positionable light sources 23 and 37 are small lamps (type General Electric No. 12). The photoelectric devices 24 and 38 in alignment with lamps 23 and 37, respectively, are phototransistors type 2N469A. Reference generator circuit 22 includes conventional electrical circuitry associated with the phototransistor and two stages of amplification employing transistors (type 2N526). The reference generator circuits associated with the phototransistors thus generate a reference or sampling pulse each time a slit 11 of disk scanner 10 uncovers the filament of lamps 23 and 37. The generation of such reference pulses is synchronous with the scanning of the brightness pattern appearing on screen 3. The position and amplitude of the reference pulses is not changed during the aim measurements of a particular projection-type lamp 7, and thus, the amplitude of the differentiated logarithmic signal is employed as the means for determining the aim point of the lamp. The readout meters 33 which indicate the instantaneous amplitude of the differentiated logarithmic signal at the time of the sampling are milliampere direct current ammeters.

The method of determining the aim point of projection-type lamps in accordance with my invention comprises the following steps. Lamp aim apparatus 1 is mounted adjacent test fixture 2, typically located about one foot therefrom, at a distance of twenty-five feet from screen 3. The side of apparatus housing 1 furthest from the screen contains the necessary controls and readout meters 33, however, such meters may be remotely located as desired. The housing of apparatus 1 is provided with adjustable mounting pads to permit alignment of the apparatus relative to the angular position of lamp test fixture 2. Initially, the alignment of apparatus 1 is performed by a mere line of sight alignment using the horizontal and vertical reference axes on the screen if such are provided. A calibrating lamp having known aim characteristics, as determined by experienced observers, is employed for the final alignment procedure. The calibrating lamp is inserted in the lamp test fixture 2 and electrical energy is applied to the lamp. A dual beam oscilloscope is preferably employed to simultaneously display the reference pulse at the output of reference generator circuit 22 and the scanned brightness pattern signal at the output of amplifier circuit 17. The reference pulse should occur near the midpoint of such scan. In the even the reference pulse is not properly centered, reference lamps 23 and 37 are adjusted in position along the periphery of disk 10 to obtain the proper centering, which occurs when the measured aim point of the apparatus agrees with the aim point of the calibrated lamp. The horizontal and vertical reference axes on white screen 3 may be employed in this final alignment step. The axes are solid dark lines on the screen surface and have relatively poor reflectivity as compared to the normal screen surface. Therefore, the scanned signal from the illusinated screen contains a sharply defined negative pulse occurring as the scan passes the reference axes due to the small amount of reflected light from such axes. This negative pulse can be detected at the outputs of circuits 16, 17, or 19 but is most sharply detected at the output of differentiator amplifier 20 (point 27). In the event of unavailability of a dual beam oscilloscope, the aim meters 33 may be employed in the final alignment step to determine the position of the sharply defined negative pulse. The lamp aim apparatus 1 is now located in its proper relationship with respect to the screen 3 and the lamp test fixture 2. Projection-type lamps may now be tested for their horizontal and vertical aim points. The calibrating lamp is removed from the lamp test fixture and the projection-type lamp 7 to be tested is inserted therein. Electrical energy is applied to the test lamp and a nonuniform beam of light emanates therefrom and illuminates screen 3 to produce a nonuniform brightness pattern thereon.

In the particular example of testing "low beam" type automobile headlamps, the brightness pattern is formed in the lower right quadrant on screen 3 as illustrated in FIGURE 1. The indication on the horizontal and vertical readout meters 33 is noted at the initial and nominal aim position of lamp test fixture 2. This nominal aim position may be indicated as zero angular readings on the horizontal angle indicator 50 and vertical angle indicator 51. The observed meter readings indicate a relative amplitude of the rate of change of the logarithmic brightness pattern along the upper and left edges of the primary beam pattern, i.e., in the vicinity of the illustrated horizontal and vertical reference axes. Lamp test fixture 2 is then rotated a fraction of a degree in elevation to determine whether a maximum reading on the vertical aim meter is found at a point other than the nominal (zero angle) vertical aim point. If a peak on the vertical aim meter is discovered displaced from the zero angle, the angular reading on angle indicator 51 is recorded or otherwise employed in determining the future use of the lamp. The lamp fixture is thence rotated in azimuth to determine the angular point at which a maximum reading on the horizontal aim meter is attained and thereby determines the horizontal aim point. The vertical aim point should then be rechecked. The position where both meters peak simultaneously is the measured aim point for the lamp and indicates that lamp 7 is aimed such that the left and top edges of the beam pattern are aligned with the reference points established internally of the apparatus 1. Thus, it should be emphasized that the horizontal and vertical reference axes on screen 3 are not inherently needed with my apparatus. They may be used for initial alignment of the apparatus, but the alignment of lamp 7 and apparatus 1 determines the lamp aim criteria, the screen 3 functioning merely as an intermediate diffuse reflector. It should be apparent that the horizontal or vertical aim can be measured first as desired.

FIGURE 3 illustrates a second embodiment of my lamp aim apparatus. The optical circuit portion which scans the brightness pattern on the reference plane 3 may be identical in both FIGURES 2 and 3, however, the embodiment illustrating the substitution of pinhole apertures 14 and 34 for lenses 47, 48 is disclosed in FIGURE 3. The electrical circuit is identical through the first differentiator amplifier 20. Photoelectric detector circuit 16, amplifier 17, and AGC circuit 18 are not illustrated, for purposes of simplification, but are employed in the same manner as in FIGURE 2.

Voltage wave forms appearing at the output of each of the circuits are illustrated in FIGURE 3. The rotation of disk 10 provides a scanning of well-defined, relatively small regions of the brightness pattern, indicated by the shaded lines in rectangular areas 45 and 46, as in the case of the first embodiment of FIGURE 2. In particular, photomultiplier tube 13 scans rectangular area 45 in the vicinity of the horizontal reference axis from top to bottom as indicated by the arrow adjacent thereto and photomultiplier 35 scans area 46 in the vicinity of the vertical reference axis in a direction from left to right. Thus, the voltage waveform at the output of the photomultipliers is seen to rise very sharply as the appropriate slit first permits the photomultiplier to view the bightness pattern and then increase at a slower rate as the particular area is scanned in a direction from the less bright to the more bright portion of the image formed on the screen.

In the FIGURE 3 embodiment, a second differentiator amplifier circuit 40 provides the second derivative of the logarithmic brightness pattern signal. A zero crossover detector circuit 41 is connected to the output of the second differentiator amplifier 40 and detects the position of the zero crossover voltage of the second differentiated signal. The output of detector circuit 41 therefore comprises spikes of voltage which occur at each point where the voltage of circuit 40 becomes or passes through the zero voltage point. An AND gate circuit 42 is connected to the output of zero crossover detector circuit 41. A second input to the AND circuit is provided from the output of logarithmic amplifier circuit 19. The AND gate circuit provides a sampling function wherein the output of zero crossover detector 41 is compared to that portion of the voltage at the output of logarithmic amplifier 19 which exceeds a predetermined value. The output of the AND gate circuit is a series of negative voltage spikes, each spike occurring at the zero crossover voltage point obtained by the second derivative output signal in passing from positive to negative polarity. The output of the AND gate circuit is connected to the reset input of a flip-flop circuit 43 and the output of first differentiator amplifier 20 is connected to the set input. Circuit 43 provides a pulse width modulated output wherein the leading edge of each pulse coincides with the leading edge of the detected brightness pattern signal at the photomultiplier tube and the trailing edge coincides with the negative spike at the output of the AND gate circuit. The pulse width is thus proportional to the position of the maximum rate of change point within the scanned zone of the differentiated logarithmic brightness pattern signal along the upper edge of the primary beam pattern, i.e., in the vicinity of the horizontal reference axis. Filter circuit 44 is connected to the output of flip-flop circuit 43 and filters out the alternating components of the pulse width modulated signal thereby resulting in a direct current signal having a magnitude directly proportional to the ratio of the pulse width to the total period elapsing between sucessive scans. A suitable readout device, such as meter 33, is connected in vertical readout circuit 30. The readout device provides a calibrated visual indication of the vertical aim point. A second electrical circuit, designated as a whole by numeral 49, contains the same elements as the electrical circuit and is adapted to detect the horizontal aim point.

The FIGURE 3 embodiment does not require a rotation of the lamp fixture to measure the lamp aim point. This results from the fact that the meter indicates the position of such point relative to the edge of the scanned zone.

From the foregoing description, it can be appreciated that my invention makes available a new method and apparatus for determining the horizontal and vertical aim point of preaimed lamps, with accuracy comparable to that obtained by visual inspection (±0.1 degree), and with far greater consistency since the factor of human judgement is omitted. My apparatus duplicates the visual response employed by human observers in viewing the lamp's primary beam pattern in the vicinity of horizontal and vertical axes described on a partially reflective screen by detecting the maximum rate of change of the logarithmic brightness pattern along the upper and left edges of the primary beam pattern as the determining criterion.

Having described a new method and two embodiments of an apparatus for determining lamp aim, it is believed obvious that modifications and variations of my invention are possible in the light of the above teachings. Thus, the respective positions of lenses 47 and 48, photoelectric devices 13 and 35, and slitted masks 15 and 36 may be different from that illustrated for particular types of projection lamps other than the "low beam" automobile headlamp. Further, the scanned zone can be shaped in any desired form by changing the geometry of slits 11 and the slits in masks 15 and 36. My apparatus may also be employed for determining the aim point of spotlights and searchlights and for aiming or directing such devices. It may also be utilized to measure small angles remotely from a reference point to a light source or a point on an illuminated object. Finally, my lamp aim apparatus may be automated to provide an automatic method of determining the horizontal and vertical aim points without the necessity for a human operator to physically rotate the lamp test fixture and search for the maximum amplitude on the meters. The automatic aim feature is attained by employing a circuit responsive to the relative magnitude of the differentiated logarithmic brightness pattern signal and providing a feedback to a suitable drive which rotates the lamp test fixture. The readout meters indicate lamp aim directly in terms of degrees from the nominal aim direction. Another automatic aim feature would utilize the feedback signal to change the position of the internally generated reference pulses and to alleviate the need for moving the lamp fixture. Similarly, readout meters coupled to the motion of the reference pulse component would indicate lamp aim. It is, therefore, to be understood that changes may be made in the particular embodiments of my invention described which are within the full intended scope of the invention as defined by the following claims.

What I claim as new and desire to secure by Letters Patent of the United States is:

1. Apparatus for determining the aim point of projection-type lamps comprising a housing, slitted rotatable means positioned within said housing for scanning across a nonuniform brightness pattern produced by a light beam emanating from a projection-type lamp and illuminating a partially reflective reference plane spaced therefrom, said housing being disposed adjacent the lamp, a first optical circuit positioned within said housing and successively coupled to each of the rotatable means slits for scanning therethrough a first relatively small region of the nonuniform brightness pattern on the reference plane along a first edge of the brightness pattern and providing at the output thereof an electrical signal representating the light intensities of the scanned first region of the nonuniform brightness pattern, a first electrical circuit operatively coupled to the output of said first optical circuit for converting the electrical signal representing the first scanned region of the brightness pattern to a first logarithmic brightness pattern electrical signal and for detecting and reading out the rate of change thereof along the first edge of the brightness pattern, a second optical circuit positioned within said housing and successively coupled to each of said rotatable means slits for scanning therethrough a second relatively small region of the nonuniform brightness pattern on the reference plane along a second edge of the brightness pattern at an angle to said first edge and providing at the output thereof an electrical signal representing the light intensities of the scanned second region of the nonuniform brightness pattern, and a second electrical circuit operatively coupled to the output of said second optical circuit for converting the electrical signal representing the second scanned region of the brightness pattern to a second logarithmic brightness pattern electrical signal and for detecting and reading out the rate of change thereof along the second edge of the brightness pattern whereby the aim point of the lamp may be determined.

2. Apparatus for determining the aim point of projection-type lamps comprising a housing, a rotatable disk positioned within said housing and having a plurality of narrow slits for scanning across the primary beam pattern of a nonuniform brightness pattern produced by a light beam emanating from a projection-type lamp and illuminating a partially reflective reference plane spaced therefrom, said housing being disposed adjacent the lamp, a first optical circuit positioned within said housing and successively optically coupled to each of the narrow slits of said disk for scanning therethrough a first relatively small region of the primary beam brightness pattern on the reference plane along a first edge of the primary beam pattern and providing at the output thereof an electrical signal representing the light intensities of the scanned first region of the primary beam brightness pattern.

a first electrical circuit operatively coupled to the output of said first optical circuit and comprising a first logarithmic amplifier for converting the electrical signal representing the first scanned region of the primary beam brightness pattern to a first logarithmic brightness pattern electrical signal, a first differentiator amplifier for detecting the rate of change of the first logarithmic brightness pattern signal, and a first readout means for determining the maximum rate of change of the first logarithmic brightness pattern signal along the first edge of the primary beam pattern, a second optical circuit positioned within said housing and spaced from said first optical circuit peripherally along said disk and successively optically coupled to each of the narrow slits of said disk for scanning therethrough a second relatively small region of the primary beam brightness pattern on the reference plane along a second edge of the primary beam pattern at an angle to said first edge and providing at the output thereof an electrical signal representing the light intensities of the scanned second region of the primary beam brightness pattern, and a second electrical circuit operatively coupled to the output of said second optical circuit and comprising a second logarithmic amplifier for converting the electrical signal representing the second scanned region of the primary beam brightness pattern to a second logarithmic brightness pattern electrical signal, a second differentiator amplifier for detecting the rate of change of the second logarithmic brightness pattern signal, and a second readout means for determining the maximum rate of change of the second logarithmic brightness pattern signal along the second edge of the primary beam pattern whereby the aim point of the lamp is determined.

3. Apparatus for determining the aim point of projection-type lamps comprising a housing, a rotatable disk supported within said housing and having a plurality of narrow radial slits spaced around the periphery thereof for scanning across the primary beam pattern of a nonuniform brightness pattern produced by a light beam emanating from a projection-type lamp and illuminating a partially reflective reference plane, said housing being disposed adjacent the lamp and spaced a particular distance from the reference plane, said disk positioned in a plane substantially parallel to the reference plane, a first optical circuit successively coupled to each of said radial slits for scanning therethrough a first selected area of the primary beam pattern and comprising a first lens positioned in said housing intermediate the disk and reference plane, a first photoelectric device positioned on the opposite side of said disk, and a first slitted mask positioned intermediate said disk and said first photoelectric device and having the slit thereof oriented substantially perpendicular to the particular disk radial slit passing within the view of said first optical circuit, said first lens, said first photoelectric device, said first slitted mask and the particular radial slit passing within the view of said first optical circuit positioned in alignment with a first selected area on the reference plane along the upper edge of the primary beam pattern, output of said first photoelectric device providing an electrical signal representing the light intensities of the scanned first selected area of the primary beam pattern, a first electrical circuit operatively coupled to the photoelectric device output of said first optical circuit and comprising a first logarithmic amplifier for converting the electrical signal representing the first scanned area of the primary beam pattern to a first logarithmic brightness pattern electrical signal, a first differentiator amplifier for obtaining the rate of change of the first logarithmic brightness pattern signal, and a first readout means in communication with said first differentiator amplifier for detecting the maximum rate of change of the first logarithmic brightness pattern signal along the upper edge of the primary beam pattern and thereby determining the vertical aim of the lamp, a second optical circuit successively coupled to each of said radial slits for scanning therethrough a second selected area of the primary beam pattern and comprising a second lens positioned in said housing intermediate the disk and reference plane, a second photoelectric device positioned on the opposite side of said disk, and a second slitted mask positioned intermediate said disk and said second photoelectric device and having the slit thereof oriented substantially perpendicular to the particular disk radial slit passing within the view of said second optical circuit, said second lens, said second photoelectric device, said second slitted mask and the particular radial slit passing within the view of said second optical circuit positioned in alignment with a second selected area on the reference plane along the left edge of the primary beam pattern, output of said second photoelectric device providing an electrical signal representing the light intensities of the scanned second selected area of the primary beam pattern.

a second electrical circuit operatively coupled to the photoelectric device output of said second optical circuit and comprising a second logarithmic amplifier for converting the electrical signal representing the second scanned area of the primary beam pattern to a second logarithmic brightness pattern electrical signal, a second differentiator amplifier for obtaining the rate of change of the second logarithmic brightness pattern signal, and a second readout means in communication with said second differentiator amplifier for detecting the maximum rate of change of the second logarithmic brightness pattern signal along the left edge of the primary beam pattern and thereby determining the horizontal aim of the lamp.

4. Apparatus for determining the aim point of projection-type lamps comprising a housing, a rotatable disk supported within said housing and having a plurality of narrow radial slits evenly spaced around the periphery thereof for scanning across the primary beam pattern of a nonuniform brightness pattern produced by a light beam emanating from a projection-type lamp and illuminating a partially reflective reference plane, said housing being disposed adjacent the lamp and spaced a predetermined distance from the reference plane, said disk positioned in a plane substantially parallel to the reference plane, a pair of first optical circuits stationarily positioned within said housing and spaced from each other peripherally along said disk, each of said first optical circuits comprising a focusing lens positioned in said housing intermediate said disk and the reference plane, a first photoelectric device positioned on the opposite side of the disk, and a first slitted mask positioned intermediate the slit portion of said disk and said first photoelectric device and in alignment therewith, each of said first optical circuits being further aligned with selected areas of the primary beam pattern on the reference plane whereby the first and second of said pair of first optical circuits are adapted to scan the selected areas disposed along the upper and left edges, respectively, of the primary beam pattern on a scanned line basis and provide at outputs of said photoelectric devices electrical signals representing the light intensities of the scanned selected areas of the primary beam pattern, a pair of second optical circuits positioned within said housing and spaced from each other and from said pair of first optical circuits peripherally along said disk, each of said second optical circuits comprising a light source positioned on one side of the disk, and a second photoelectric device positioned on the opposite side of said disk and in alignment with the radial slit portion of said disk and said light source whereby a train of electrical reference pulses is generated in synchronism with the rotation of said disk, and a pair of electrical circuits, each of said pair of electrical circuits operatively coupled to an output of a different one of said pair of first optical circuits and a different one of said pair of second optical circuits, each of said electrical circuits comprising a serial connection of a logarithmic amplifier operatively coupled to an output of said first photoelectric device for converting the electrical signal representing the scanned area of the primary beam pattern to a logarithmic brightness pattern signal, and a differentiator amplifier for obtaining the rate of change of the logarithmic brightness pattern signal, a sampler circuit connected to the outputs of said differentiator amplifier and said second photoelectric device whereby the respective relative magnitudes of the rate of change of the logarithmic brightness pattern along the upper and left edges of the primary beam pattern is determined, and a readout device for detecting the maximum rate of change of the logarithmic brightness pattern along the upper and left edges of the primary beam pattern and thereby determining respectively the vertical and horizontal aim points of the lamp.

5. Apparatus for determining the aim point of projection-type lamps comprising a housing, a rotatable disk supported within said housing and having a plurality of narrow radial slits evenly spaced around the periphery thereof for scanning across the primary beam pattern of a nonuniform brightness pattern produced by a light beam emanating from a projection-type lamp and illuminating a partially reflective reference plane, said housing being disposed adjacent the lamp and spaced a predetermined distance from the reference plane, said disk positioned in a plane substantially parallel to the reference plane, a pair of optical circuits stationarily positioned within said housing and spaced from each other peripherally along said disk, each of said optical circuits comprising a focusing lens positioned in said housing intermediate said disk and the reference plane, a photoelectric device positioned on the opposite side of said disk, and a first slitted mask positioned intermediate the slit portion of said disk and said photoelectric device and in alignment therewith, each of said optical circuits being further aligned with selected areas of the primary beam pattern on the reference plane whereby the first and second of said pair of optical circuits are adapted to scan the selected areas disposed along the upper and left edges, respectively, of the primary beam pattern on a scanned line basis and provide at outputs of said photoelectric devices electrical signals representing the light intensities of the scanned selected areas of the primary beam pattern, a pair of electrical circuits, each of said pair of electrical circuits operatively coupled to an output of a different one of said pair of optical circuits, each of said electrical circuits comprising a logarithmic amplifier operatively coupled to an output of said photoelectric device for converting the electrical signal representing the scanned area of the primary beam pattern to a logarithmic brightness pattern signal, a first differentiator amplifier operatively coupled to an output of said logarithmic amplifier for obtaining the rate of change of the logarithmic brightness pattern signal, a second differentiator amplifier operatively coupled to an output of said first differentiator amplifier, and electrical circuit means in communication with said logarithmic amplifier, said first differentiator amplifier and said second differentiator amplifier for generating a pulse width modulated signal wherein the pulse width of the signal generated in the electrical circuit means of the electrical circuit coupled to said first optical circuit is proproportional to the position of the maximum rate of change of the logarithmic brightness pattern along the upper of the primary beam pattern and the pulse width of the signal generated in the electrical circuit means of the electrical circuit coupled to said second optical circuit is proportional to the position of the maximum rate of change of the logarithmic brightness pattern along the left edge of the primary beam pattern thereby determining, respectively, the vertical and horizontal aim points of the lamp.

References Cited
UNITED STATES PATENTS
2,988,953 6/1961 Barnett _____ 88—14
2,854,883 10/1958 Jones et al. _____ 88—14

OTHER REFERENCES
Rabedeau, M. E., Mechanical Scanner, IBM Technical Disclosure Bulletin, vol. 8, No. 2; July 1965, pp. 276–277.

JEWELL H. PEDERSEN, *Primary Examiner.*

A. A. KASHINSKI, *Assistant Examiner.*